US011829806B2

(12) United States Patent
Yoshimoto et al.

(10) Patent No.: US 11,829,806 B2
(45) Date of Patent: Nov. 28, 2023

(54) HIGH-SPEED BARRIER SYNCHRONIZATION PROCESSING THAT INCLUDES A PLURALITY OF DIFFERENT PROCESSING STAGES TO BE PROCESSED STEPWISE WITH A PLURALITY OF REGISTERS

(71) Applicant: FUJITSU LIMITED, Kawasaki (JP)

(72) Inventors: Kazuya Yoshimoto, Yokohama (JP); Yuji Kondo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 615 days.

(21) Appl. No.: 16/850,424

(22) Filed: Apr. 16, 2020

(65) Prior Publication Data

US 2020/0341822 A1    Oct. 29, 2020

(30) Foreign Application Priority Data

Apr. 23, 2019  (JP) ................................ 2019-082006

(51) Int. Cl.
*G06F 9/52*       (2006.01)

(52) U.S. Cl.
CPC ................... *G06F 9/522* (2013.01)

(58) Field of Classification Search
CPC ..................................... G06F 9/522
See application file for complete search history.

(56) References Cited

U.S. PATENT DOCUMENTS

| 5,594,884 A | * | 1/1997 | Matoba | G06F 9/3804 711/131 |
| 6,434,664 B1 | * | 8/2002 | Buch | G06F 3/0611 711/112 |
| 2003/0224773 A1 | * | 12/2003 | Deeds | H04M 1/72427 455/566 |
| 2010/0124241 A1 | | 5/2010 | Hiramoto et al. | |

(Continued)

FOREIGN PATENT DOCUMENTS

| JP | H07-152712 A | 6/1995 |
| JP | 2003-108392 A | 4/2003 |

(Continued)

*Primary Examiner* — Meng Ai T An
*Assistant Examiner* — Zujia Xu
(74) *Attorney, Agent, or Firm* — Fujitsu Patent Center

(57) ABSTRACT

An arithmetic processor performs arithmetic processing, and a synchronization processor, including first registers, performs synchronization processing that includes a plurality of processing stages to be processed stepwise. The arithmetic processor sends, to the synchronization processor, setting information to be used in a predetermined processing stage of the synchronization processing, and instruct the synchronization processor to execute the predetermined processing stage for the arithmetic processing. Each of the first registers includes a setting information management area to manage the setting information received from the arithmetic processor, and a destination status area to store a usage state of each of destination registers which are used in a next processing stage following the predetermined processing stage. The synchronization processor executes the predetermined pro- (Continued)

cessing stage by transferring data between the first registers to cause the synchronization processing to proceed to the next processing stage.

18 Claims, 10 Drawing Sheets

(56) References Cited

U.S. PATENT DOCUMENTS

| | | |
|---|---|---|
| 2012/0159019 A1 | 6/2012 | Inque et al. |
| 2012/0159121 A1 | 6/2012 | Inque et al. |
| 2017/0315942 A1* | 11/2017 | Jia ..................... G06F 13/4221 |
| 2019/0102268 A1* | 4/2019 | Bingo ................. G06F 9/45558 |
| 2019/0121784 A1 | 4/2019 | Wilkinson et al. |

FOREIGN PATENT DOCUMENTS

| | | | |
|---|---|---|---|
| JP | 2010-122848 A | 6/2010 |
| JP | 2012-128808 A | 7/2012 |
| JP | 2012-128809 A | 7/2012 |
| JP | 2019-079526 A | 5/2019 |

\* cited by examiner

HIGH-SPEED BARRIER SYNCHRONIZATION PROCESSING THAT INCLUDES A PLURALITY OF DIFFERENT PROCESSING STAGES TO BE PROCESSED STEPWISE WITH A PLURALITY OF REGISTERS

CROSS-REFERENCE TO RELATED APPLICATION

This application is based upon and claims the benefit of priority of the prior Japanese Patent Application No. 2019-82006, filed on Apr. 23, 2019, the entire contents of which are incorporated herein by reference.

FIELD

The embodiment discussed herein is related to high-speed barrier synchronization.

BACKGROUND

In the field of high-performance computing (HPC) and the like, in addition to the case where calculation is performed by a single process, there are many cases where calculation is performed in parallel by a plurality of processes operating in cooperation with each other. In such a case, communication is performed among processes in order for the processes to perform calculation in cooperation with each other. Communication among processes includes not only one-to-one communication but also collective communication such as one-to-N, N-to-N, and N-to-one communication.

Barrier synchronization exists as a method for synchronization among processes when performing collective communication. Barrier synchronization is a synchronization method used to match the progress of processing performed by each process. In barrier synchronization, a point for starting synchronization in each process called a "barrier point" is set. When processing of each process for performing barrier synchronization reaches a barrier point, the process starts synchronization processing. By performing communication, it is recognized that all of the processes to be synchronized have reached the barrier point. Thus, multiple processes that are executed in parallel may be synchronized with each other.

There is a piece of hardware dedicated for speeding up barrier synchronization. On the other hand, even in software, there is a great expectation for speeding up and increasing the functionality of collective communication such that non-blocking communication in collective communication including barrier synchronization is defined as a framework or the like.

As a technique related to barrier synchronization, there is a technique of related art in which a process that has reached a barrier point sends a message, and each process determines whether or not barrier synchronization has been completed based on the number of received messages. There is a technique of related art in which completion of synchronization is determined by repeating that a notification is set to a synchronization area when a thread reaches a barrier point, a synchronization area for another thread is checked to confirm whether synchronization has been completed for both the threads, and then a notification is set to the synchronization area.

The related art is described in Japanese Laid-open Patent Publication No. 2012-128808, Japanese Laid-open Patent Publication No. 2012-128809, Japanese Laid-open Patent Publication No. 2010-122848, Japanese Laid-open Patent Publication No. 7-152712, and Japanese Laid-open Patent Publication No. 2003-108392.

SUMMARY

According to an aspect of the embodiments, an apparatus includes an arithmetic processing device and a synchronization device including a first plurality of registers, where the arithmetic processing device performs arithmetic processing, and the synchronization device performs synchronization processing that includes a plurality of processing stages to be processed stepwise. The arithmetic processing device sends, to the synchronization device, setting information to be used in a predetermined processing stage of the synchronization processing, and instruct the synchronization device to execute the predetermined processing stage for the arithmetic processing. Each of the plurality of registers includes a setting information management area to manage the setting information received from the first processor, and a destination status area to store a usage state of each of destination registers which are used in a next processing stage following the predetermined processing stage. The synchronization device executes, for a first register among the plurality of registers which is used for executing the predetermined processing stage, a first process by transferring data between the first plurality of registers, where the first process includes: upon starting the predetermined processing stage, setting the usage state of each of the destination registers stored in the destination status area as an in-use state, upon receiving a first release notification indicating a release of a first destination register among the destination registers, setting the usage state of the first destination register stored in the destination status area of the first register as a not-in-use state, when the usage state of a second destination register among the destination registers is in the not-in-use state, executing, based on the setting information stored in the first register, the predetermined processing stage for the second destination register, and when the predetermined processing stage is executed for all the destination registers, sending, to source registers which are used for executing a previous processing stage preceding the predetermined processing stage, a second release notification indicating a release of the first register used for executing the predetermined processing stage to cause the synchronization processing to proceed to the next processing stage.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

A barrier synchronization device of related art has a mechanism in which a resource such as a register is locked at the start of barrier synchronization processing and the resource is released at the completion of the barrier synchronization processing. Therefore, when the barrier synchronization device of related art consecutively performs barrier synchronization processing, it is difficult to perform the next barrier synchronization processing unless certain barrier synchronization processing is completed.

In contrast, in recent years, barrier synchronization processing may be divided into a plurality of stages. However, since resources are not released during barrier synchronization processing in a barrier synchronization device of related art, it is inevitable that barrier synchronization processing is performed after certain barrier synchronization processing is completed when using the same resources. Therefore, in the barrier synchronization device of related art, it is difficult to speed up barrier synchronization processing. Even in the technique of related art for speeding up barrier synchronization processing using hardware or software, it is difficult to speed up the barrier synchronization processing since the next barrier synchronization processing is performed after certain barrier synchronization processing is completed when using the same resources.

Even in the technique of related art in which the completion of barrier synchronization is determined based on the number of received messages, it is difficult to speed up the barrier synchronization processing since the next barrier synchronization processing is performed after certain barrier synchronization processing is completed when using the same resources. This is the same in the technique of related art in which the completion of the barrier synchronization processing is determined using the synchronization areas.

Even in the case where barrier synchronization processing is performed consecutively, it is desirable to speed up the processing.

An embodiment of an information processing apparatus, a synchronization device, and a method of controlling an Information processing apparatus disclosed in the present application will be described below in detail based on the drawings. The following embodiment does not limit the information processing apparatus, the synchronization device, and the method of controlling the information processing apparatus that are disclosed in the present application.

First Embodiment

Figure 1:
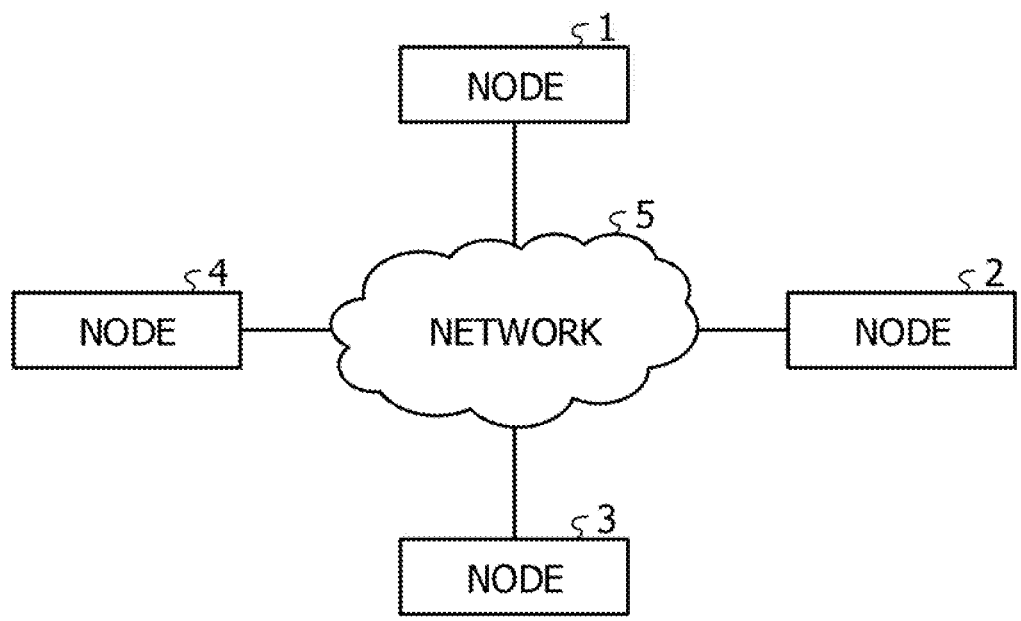
FIG. 1 is a system configuration diagram illustrating an example of an information processing system that performs barrier synchronization.

FIG. 1 is a system configuration diagram illustrating an example of an information processing system that performs barrier synchronization. Nodes 1 to 4 are information processing apparatuses that execute computation. The nodes 1 to 4 are coupled to a network 5. The nodes 1 to 4 transmit and receive data to and from each other via the network 5. All the nodes 1 to 4 have the same function with respect to barrier synchronization. Description is given below with the node 1 as an example.

Figure 2:
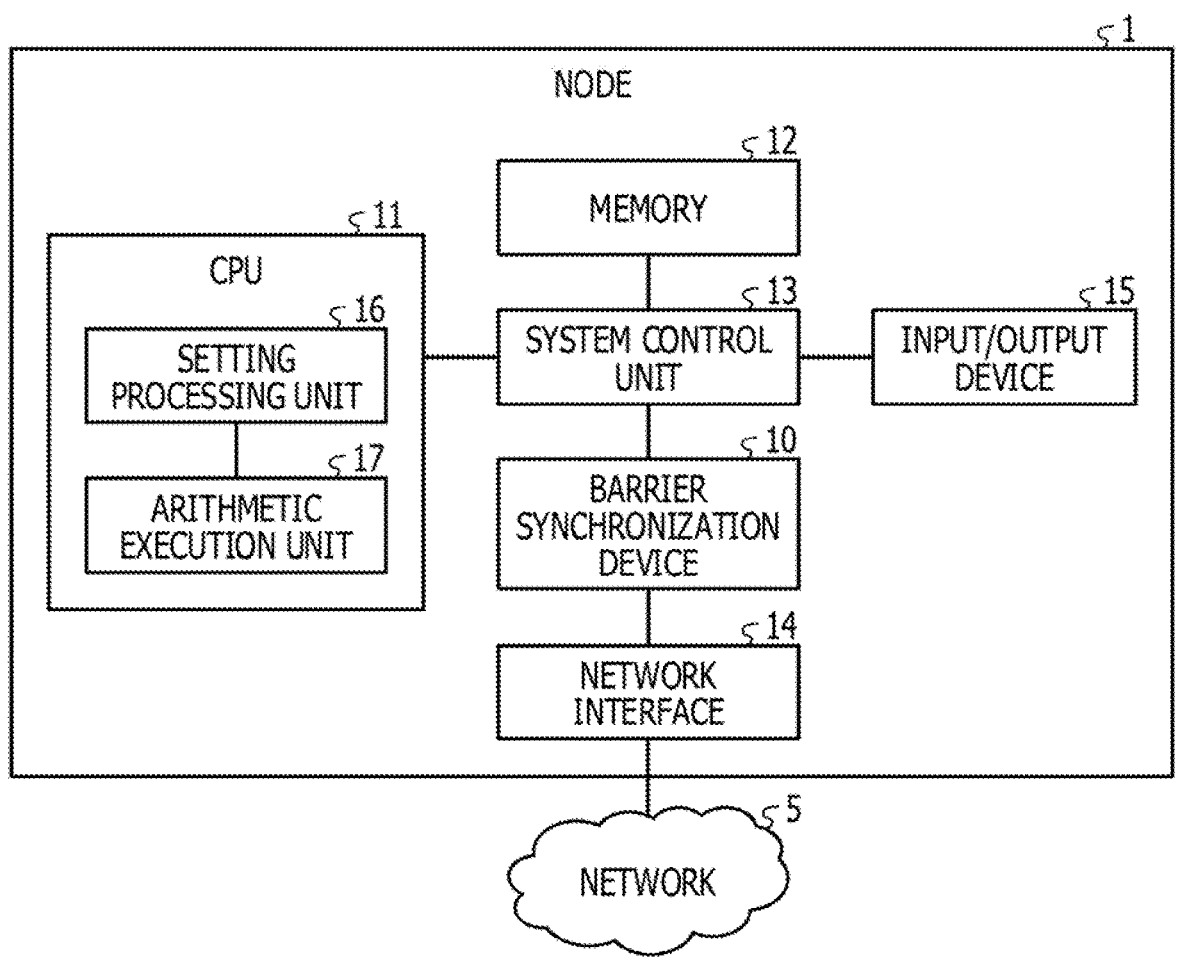
FIG. 2 is a block diagram of a node.

FIG. 2 is a block diagram of a node. The node 1 includes a barrier synchronization device 10, a central processing unit (CPU) 11 serving as an arithmetic processing device, a memory 12 serving as a storage device, a system control unit 13, a network interface 14, and an input/output device 15. The barrier synchronization device 10 is an example of a "synchronization device".

The CPU 11 is coupled to the system control unit 13 via a bus. The CPU 11 communicates with the barrier synchronization device 10, the memory 12, and the input/output device 15 via the system control unit 13. The CPU 11 includes a setting processing unit 16 and an arithmetic execution unit 17.

The arithmetic execution unit 17 executes parallel calculation in cooperation with CPUs 11 of the nodes 2 to 4. For example, the arithmetic execution unit 17 loads one or more processes to the memory 12 and causes them to operate in arithmetic processing. A process may be considered as a concept representing a state in which resources used for arithmetic processing are allocated to a program for causing arithmetic processing to be performed and a state in which the program is executed. For example, a parallel calculation includes a plurality of programs for causing a plurality of types of arithmetic processing to be performed. A process is generated for each of the types of arithmetic processing. One or more instructions are included in one program. The concept representing the execution of an instruction in a process is sometimes referred to as a thread. For example, a process includes one or more threads. Arithmetic processing executed by a program is sometimes referred to as a job.

The arithmetic execution unit 17 determines the execution of barrier synchronization for processes caused to operate during the execution of parallel calculation, for example. For example, when each process reaches its own barrier point, the arithmetic execution unit 17 starts processing of barrier synchronization. After that, the arithmetic execution unit 17 receives barrier synchronization establishment notifications from the barrier synchronization device 10 via the system control unit 13. When receiving the barrier synchronization establishment notifications from all the processes, the arithmetic execution unit 17 executes arithmetic processing by using the result of the barrier synchronization processing. There may be cases where the same process repeats the barrier synchronization processing a plurality of times.

The setting processing unit 16 receives, from the system control unit 13, input of setting conditions that are used for barrier synchronization and are input by an operator by using the input/output device 15. The setting conditions include information on a coupling source and a destination of synchronization signals used for barrier synchronization in each processing stage of barrier synchronization processing. This information will be described later in detail. The setting conditions further include an algorithm and an execution condition of the barrier synchronization processing.

The setting processing unit 16 transmits the setting conditions used for barrier synchronization to the barrier synchronization device 10 via the system control unit 13. In response to an instruction from the arithmetic execution unit 17, the setting processing unit 16 transmits a notification of reaching a barrier point to the barrier synchronization device 10 via the system control unit 13.

The system control unit 13 performs overall control of various types of processing executed in the node 1. For example, the system control unit 13 relays transmission/reception of data between the CPU 11 and the barrier synchronization device 10, between the CPU 11 and the memory 12, and between the CPU 11 and the input/output device 15.

The memory 12 stores various programs including a program for parallel calculation executed by the arithmetic execution unit 17 and so on. In the memory 12, a process in parallel calculation is loaded and executed by the arithmetic execution unit 17. The memory 12 also stores various kinds of data such as data for use in parallel calculation and calculation results.

The input/output device 15 includes, for example, a keyboard, a mouse, a display, and the like. The input/output device 15 transmits data input by an operator with a keyboard or the like to the CPU 11 via the system control unit 13. The input/output device 15 displays data transmitted from the CPU 11 via the system control unit 13 on a display or the like.

The barrier synchronization device 10 is coupled to the system control unit 13 and the network interface 14. The barrier synchronization device 10 is coupled to the network 5 via the network interface 14. The barrier synchronization device 10 communicates with other barrier synchronization devices 10 of the nodes 2 to 4 via the network 5.

The barrier synchronization device 10 receives, via the system control unit 13, the setting conditions for use in barrier synchronization transmitted from the setting processing unit 16 of the CPU 11. The barrier synchronization device 10 receives a notification of reaching a barrier point for each process via the system control unit 13. The barrier synchronization device 10 executes barrier synchronization processing in accordance with the setting conditions.

Barrier synchronization processing includes one or more types of barrier synchronization processing among a plurality of processes operating in the node 1 and barrier synchronization processing among processes operating in the nodes 2 to 4 by communication with the other barrier synchronization devices 10 via the network 5. Barrier synchronization processing in the node 1 may be considered to be the same as barrier synchronization processing with the other nodes 2 to 4 via the network by replacing the communication via the network with the communication within the node 1. Barrier synchronization processing with the other nodes 2 to 4 is mainly described below, but the same applies to barrier synchronization processing within the node 1.

Figure 3:
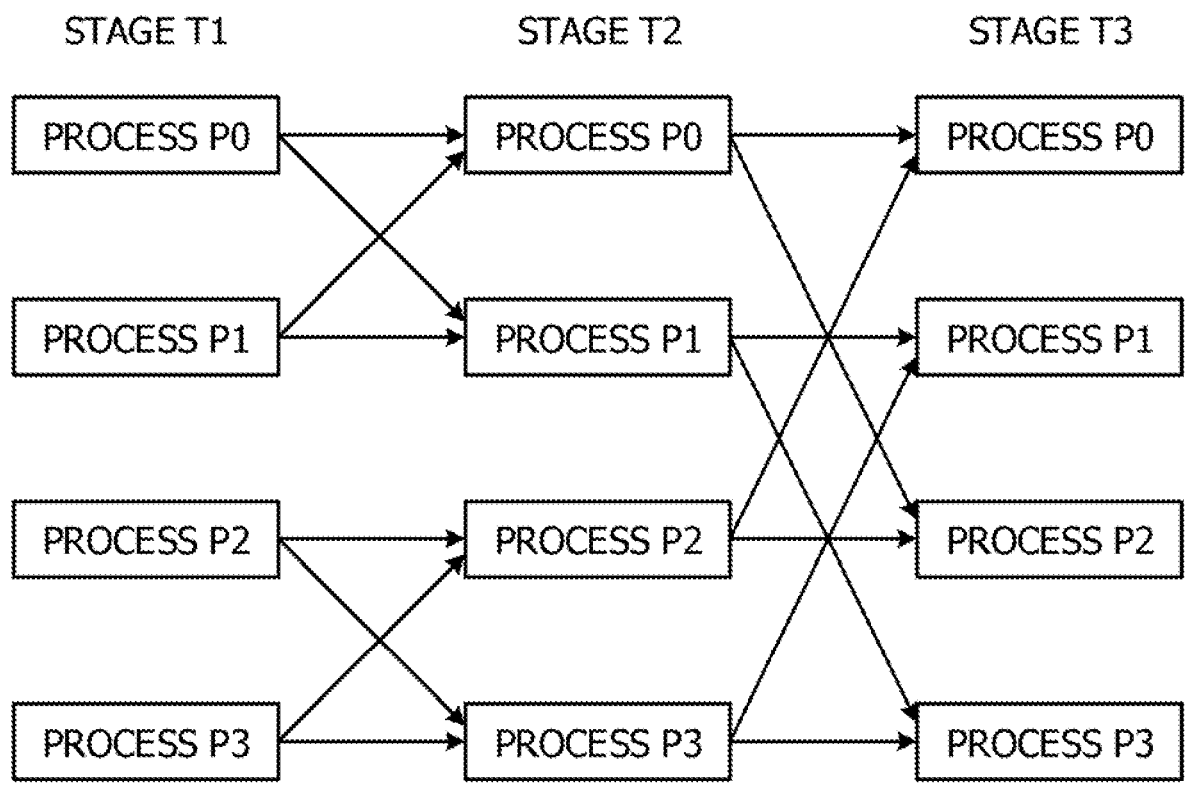
FIG. 3 is a diagram illustrating a flow of processing in a case where four processes perform synchronization processing by butterfly computation.

The barrier synchronization device 10 according to the present embodiment performs barrier synchronization processing in accordance with an algorithm of butterfly computation illustrated in FIG. 3. FIG. 3 is a diagram illustrating a flow of processing in a case where four processes perform synchronization processing by butterfly computation. The butterfly computation in this description is an example of algorithms for barrier synchronization processing, and the barrier synchronization device 10 may perform barrier synchronization processing using a different algorithm.

For example, when reaching a barrier point, a process P0 executes processing in a stage T1 in which synchronization processing is started. Next, the process P0 executes processing in a stage T2 in which the processes P0 and P1 are synchronized. For example, when synchronization processing is a reduction operation, the processes P0 and P1 wait for data to be used for the operation, perform a specified operation, and hold the operation result. Next, the process P0 executes processing in a stage T3 in which synchronization completion notifications of the processes P0 and P1 and synchronization completion notifications of the processes P2 and P3 are waited for. For example, when synchronization processing is a reduction operation, the processes P0 and P2 wait for data to be used for the operation, perform a specified operation, and hold the operation result. As a result, barrier synchronization processing among the processes P0 to P3 is completed. However, there is synchronization processing in which data is not transferred. In such a case, a notification is made among the processes P0 to P4.

In the present embodiment, description is given for barrier synchronization processing performed by processes, but the same applies to other targets that execute arithmetic processing in parallel calculation. For example, barrier synchronization processing described herein may be considered as barrier synchronization processing performed by jobs or threads.

Figure 4:
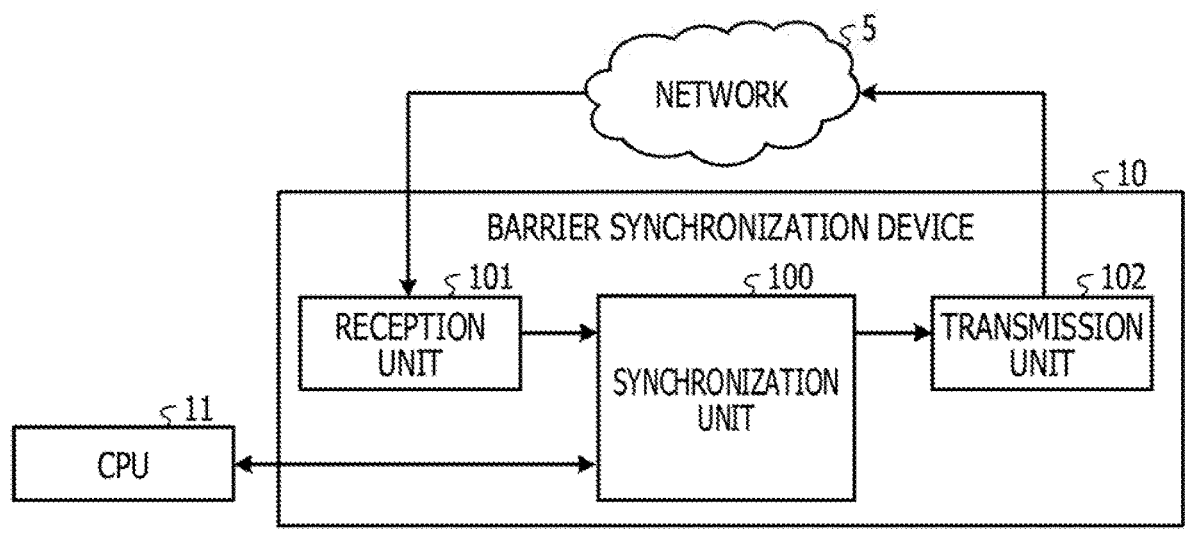
FIG. 4 is a block diagram of a barrier synchronization device according to an embodiment.

Barrier synchronization processing performed by the barrier synchronization device 10 is described below in detail. FIG. 4 is a block diagram of a barrier synchronization device according to the embodiment. The barrier synchronization device 10 includes a synchronization unit 100, a reception unit 101, and a transmission unit 102. The barrier synchronization device 10 is realized by, for example, a large scale integrated circuit (LSI).

The reception unit 101 is coupled to the network 5. The reception unit 101 receives, for example, synchronization signals and release notifications transmitted from transmission units 102 of the barrier synchronization devices 10 of the nodes 2 to 4 via the network 5. The reception unit 101 outputs the received synchronization signals and release notifications to the synchronization unit 100.

The transmission unit 102 is coupled to the network 5. The transmission unit 102 receives, for example, input of synchronization signals and release notifications from the synchronization unit 100. The transmission unit 102 transmits the acquired synchronization signals and release notifications to reception units 101 of the barrier synchronization devices 10 of the nodes 2 to 4 via the network 5.

Figure 5:
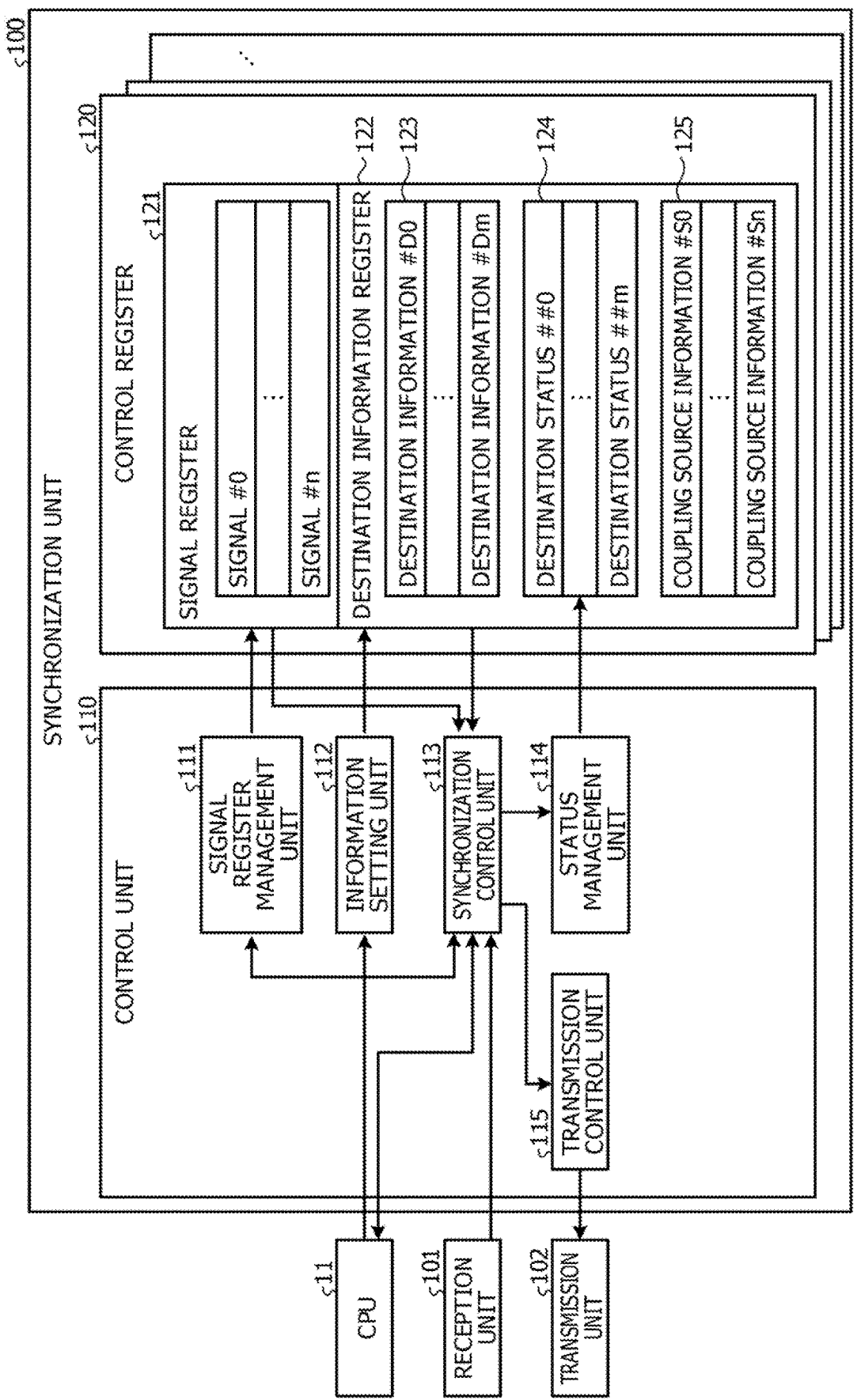
FIG. 5 is a block diagram illustrating the details of a synchronization unit.

FIG. 5 is a block diagram illustrating the details of a synchronization unit. The synchronization unit 100 includes a control unit 110 and control registers 120. The function of the control unit 110 is realized by, for example, a processor, an embedded circuit, or the like. The function of the control registers 120 is realized by, for example, a flip-flop or a memory.

There are a plurality of control registers 120. There are a sufficient number of control registers 120 for being used as a coupling source and a destination of synchronization signals. A coupling source of a certain control register 120 refers to a control register 120 that transmits a synchronization signal to the certain control register 120 in barrier synchronization processing. For example, a coupling source of a certain control register 120 refers to a control register 120 that performs processing in a stage immediately before the stage in which the certain control register 120 performs processing. A destination of a certain control register 120 refers to a control register 120 to which a synchronization signal is transmitted from the certain control register 120. For example, a destination of a certain control register 120 refers to a control register 120 that performs processing in a stage following the stage in which the certain control register 120 performs processing.

Each of the control registers 120 includes a signal register 121 and a destination information register 122. The signal register 121 stores the waiting state of barrier synchronization corresponding to the control register 120. For example, the signal register 121 holds the values of signals #0 to #n, the number of which is equal to the number of control registers 120 serving as coupling sources. For example, there are n+1 control registers 120 as coupling sources of a control register 120. If the value of the signal #i is 0, it means that the node 1 has not received a synchronization signal from the control register 120 corresponding to the signal #i. Conversely, if the value of the signal #i is 1, it means that the node 1 has received a synchronization signal from the control register 120 corresponding to the signal #i.

The destination information register 122 includes destination information 123, a destination status 124, and coupling source information 125. The destination information register 122 stores information notified as the setting conditions and information Indicating a busy state of the stage following the stage in which the control register 120 including this destination information register performs processing. The busy state of the following stage corresponds to information indicating whether or not the control register 120 to be a destination is performing processing and is in use.

The destination information 123 stores destination information #D0 to destination information #Dm including destination addresses of the nodes 2 to 4 being destinations of synchronization signals transmitted by a control register 120 corresponding to a predetermined algorithm of barrier synchronization processing and the numbers given for control registers 120 being destinations. There are the same number of pieces of destination information #D0 to #Dm as the number of control registers 120 to be the destinations of synchronization signals. For example, there are m+1 control registers 120 as destinations of synchronization signals of a control register 120.

The coupling source information 125 stores coupling source information #S0 to coupling source information #Sn including coupling source addresses of the nodes 2 to 4 being coupling sources from which a control register 120 corresponding to a predetermined algorithm of barrier synchronization processing receives synchronization signals and stores the numbers given for control registers 120 being the coupling sources. There are the same number of pieces of coupling source information #S0 to #Sm as the number of control registers 120 to be the coupling sources. For example, when the number of control registers 120 being coupling sources is two and the number of control registers 120 being destinations is two, both m and n are 1.

The destination status 124 stores a busy state of the stage following the stage in which the control register 120 storing the destination status performs processing. From the busy state of the following stage, it is possible to determine whether or not a control register 120 being a destination is in use because the destination control register 120 is executing the processing. The destination status 124 includes the destination statuses ##0 to ##m, the number of which is equal to the number of control registers 120 being destinations of synchronization signals. When the value of the destination status ##j is 1, the control register 120 corresponding to the destination status ##j is in use, for example, the following stage is in a busy state. Conversely, when the value of the destination status ##j is 0, the control register 120 corresponding to the destination status ##j is released and not in use, for example, the following stage is not in a busy state.

Pieces of information of the destination information 123 and the coupling source information 125 in the destination information register 122 of the control register 120 are written by an information setting unit 112 according to the setting conditions received from the setting processing unit 16 of the CPU 11. By setting a coupling source and a destination of a synchronization signal in each of the control registers 120, the control registers 120 are coupled to each other with a coupling structure according to the algorithm of butterfly computation. However, butterfly computation is an example of an algorithm for performing the synchronization processing, and a different algorithm may be used.

As illustrated in FIG. 5, the control unit 110 includes a signal register management unit 111, the information setting unit 112, a synchronization control unit 113, a status management unit 114, and a transmission control unit 115.

The information setting unit 112 receives setting conditions relating to barrier synchronization from the setting processing unit 16 of the CPU 11. The information setting unit 112 registers the number given for a control register 120 with the destination information register 122 of the control register 120 in accordance with the acquired setting conditions. The information setting unit 112 writes the number given for the control register 120 in the destination information register 122 of the control register 120 in accordance with the acquired setting conditions. A destination address is determined from the node number determined by the system and the number given for the control register 120.

The synchronization control unit 113 acquires an algorithm and an execution condition of barrier synchronization processing from the setting conditions transmitted from the setting processing unit 16 of the CPU 11. The synchronization control unit 113 determines whether the stage in which a control register 120 indicated in the barrier synchronization processing performs processing is the start stage, the relay stage, or the final stage, using the algorithm of the barrier synchronization processing. A control register 120 indicated by barrier synchronization processing is hereinafter referred to as a "control register 120 to be controlled". The stage in which the control register 120 to be controlled performs processing is referred to as an "own stage".

In the case where the own stage is the relay stage or the final stage, the synchronization control unit 113 outputs an instruction to initialize the signal register 121 to the signal register management unit 111 when an algorithm of barrier synchronization processing is acquired. In the case where the own stage is the start stage, the synchronization control unit 113 does not have to initialize the signal register 121.

Next, the synchronization control unit 113 receives a barrier synchronization start signal as a notification of reaching the barrier point from the arithmetic execution unit 17 of the CPU 11. When receiving the barrier synchronization start signal, the synchronization control unit 113 starts barrier synchronization processing in accordance with the execution condition.

The synchronization control unit 113 receives input of synchronization signals and coupling source information from the reception unit 101. However, the input of the synchronization signals and the coupling source information is not performed in the start stage. The synchronization control unit 113 notifies the signal register management unit 111 of the coupling source information.

When the own stage is the start stage, the synchronization control unit 113 reads out the destination information 123 of a control register 120 indicated in the barrier synchronization processing. Next, the synchronization control unit 113 acquires the destination status 124 of each of the destination information #D0 to the destination information #Dm. The synchronization control unit 113 waits until any of the destination statuses ##0 to ##m is released and a busy state is canceled.

When a value indicating release is present in the destination statuses ##0 to ##m, the synchronization control unit 113 sets a control register 120 of the following stage which is released and is no longer in a busy state as a destination of transmission. Since a stage serving as a coupling source does not exist when the own stage is the start stage, the synchronization control unit 113 does not have to transmit a release notification to the stage serving as the coupling source.

After that, the synchronization control unit 113 outputs, to the transmission control unit 115, a request to transmit a synchronization signal to the control register 120 serving as the destination of transmission without waiting for synchronization signals from the coupling-source stage because the own stage is the start stage. The synchronization control unit 113 also outputs, to the status management unit 114, the destination information used for transmitting synchronization signals to cause the status management unit 114 to change the status. However, since the own stage is the start stage in this case, even when transmission of all synchronization signals to the control registers 120 serving as destinations is completed, the synchronization control unit 113 does not transmit a release notification to the coupling-source stage.

After that, when there is a destination to which a synchronization signal has not yet been transmitted, the synchronization control unit 113 updates the destination of transmission using the destination status 124. The synchronization control unit 113 outputs, to the transmission control unit 115, a request to transmit a synchronization signal to a control register 120 that has been newly set as the destination of transmission. When transmission of synchronization signals to all of the control registers 120 serving as destinations is completed, the synchronization control unit 113 completes the synchronization processing in the start stage.

When the own stage is the relay stage, the synchronization control unit 113 reads out the destination information 123 of a control register 120 indicated in the barrier synchronization processing. Next, the synchronization control unit 113 acquires the destination status 124 of each of the destination information #D0 to the destination information #Dm. The synchronization control unit 113 waits until any of the destination statuses ##0 to ##m is released and the control register 120 serving as the destination is in a not-in-use state.

If there is a released one among the destination statuses ##0 to ##m, the synchronization control unit 113 sets the control register 120 of the following stage which is not in use, as a "destination of transmission".

Next, the synchronization control unit 113 refers to the signal register 121 to determine whether or not reception of synchronization signals from all the coupling sources has been completed. When any of the signals #0 to #n is 0 and there is a coupling source that has not completed reception of a synchronization signal, the synchronization control unit 113 repeats the checking of the destination status 124 to update the destination of transmission.

When all of the signals #0 to #n are 1 and reception of synchronization signals from all the coupling sources is completed, the synchronization control unit 113 outputs, to the transmission control unit 115, a request to transmit a synchronization signal to a control register 120 serving as the destination of transmission. The synchronization control unit 113 also outputs, to the status management unit 114, the destination information used for transmitting synchronization signals to cause the status management unit 114 to change the status.

After that, when there is a destination to which a synchronization signal has not yet been transmitted, the synchronization control unit 113 updates the destination of transmission using the destination status 124. The synchronization control unit 113 outputs, to the transmission control unit 115, a request to transmit a synchronization signal to the control register 120 that has been newly set as the destination of transmission, and instructs the status management unit 114 to change the status.

In contrast, when transmission of synchronization signals to all the control registers 120 serving as destinations is completed, the synchronization control unit 113 outputs an instruction to transmit a release notification to the transmission control unit 115, and completes the synchronization processing in the control register 120 to be controlled.

When the own stage is the final stage, the synchronization control unit 113 refers to the signal register 121 to determine whether or not reception of synchronization signals from all the coupling sources has been completed. If the own stage is the final stage, synchronization signals are not transmitted. When any of the signals #0 to #n is 0 and there is a coupling source that has not completed reception of a synchronization signal, the synchronization control unit 113 repeats the checking of the destination status 124 to update the destination of transmission.

When all of the signals #0 to #n are 1 and reception of synchronization signals from all the coupling sources is completed, the synchronization control unit 113 transmits a barrier synchronization completion notification to the arithmetic execution unit 17 of the CPU 11. Thus, synchronization processing for one process is completed. After that, the synchronization control unit 113 outputs an instruction to transmit a release notification to the transmission control unit 115.

The following description is for operations of the respective units not relating to the start stage, the relay stage, and the final stage, and operations without regard to the time series in the above description. The synchronization control unit 113 receives input of a release notification and information on a control register 120 being the transmission source of the release notification, from the reception unit 101. The synchronization control unit 113 instructs the status management unit 114 to release the status corresponding to the control register 120 being the transmission source of the release notification.

The signal register management unit 111 receives an instruction to initialize the signal register 121 from the synchronization control unit 113. The signal register management unit 111 sets the value of each of the signals #0 to #n in the signal register 121 included in a control register 120 to be controlled to 0 to initialize the signal register 121.

The signal register management unit 111 receives input of an instruction to reset the control register 120 to be controlled from the synchronization control unit 113. The signal register management unit 111 resets the signal register 121 of the control register 120 to be controlled.

After that, the signal register management unit 111 receives input of coupling source information on the coupling source which has transmitted a synchronization signal, from the synchronization control unit 113. The signal register management unit 111 changes the value of any one of the signals #0 to #n corresponding to the acquired coupling source information to 1, and sets a state indicating that reception of synchronization signals from the stage of the coupling source is completed.

The status management unit 114 receives input of information on a control register 120 being the transmission destination of synchronization signals from the synchronization control unit 113. The status management unit 114 changes the value of any one of the destination statuses ##0 to ##m corresponding to the control register 120 being the transmission destination of synchronization signals to 1, and sets a state indicating that the stage in which the control register 120 performs processing is busy.

The status management unit 114 receives, from the synchronization control unit 113, input of an instruction to release the status of the control register 120 being the transmission source of release notifications. Next, the status management unit 114 changes the value of any of the destination statuses ##0 to ##m corresponding to the control register 120 being the transmission source of release notifications to 0, and sets a state indicating that the stage in which the control register 120 performs processing is released.

The transmission control unit 115 receives, from the synchronization control unit 113, a transmission request of a synchronization signal to a control register 120 being the destination of transmission. The transmission control unit 115 causes the transmission unit 102 to transmit the synchronization signal to the specified control register 120.

When transmission of synchronization signals to all of the control registers 120 being destinations is completed, the transmission control unit 115 receives an instruction to transmit a release notification from the synchronization control unit 113. The transmission control unit 115 acquires information on a control register 120 being the coupling source of the control register 120 to be controlled, from the coupling source information 125. After that, the transmission control unit 115 causes the transmission unit 102 to transmit the release notification to the control register 120 being the coupling source.

Figure 6:
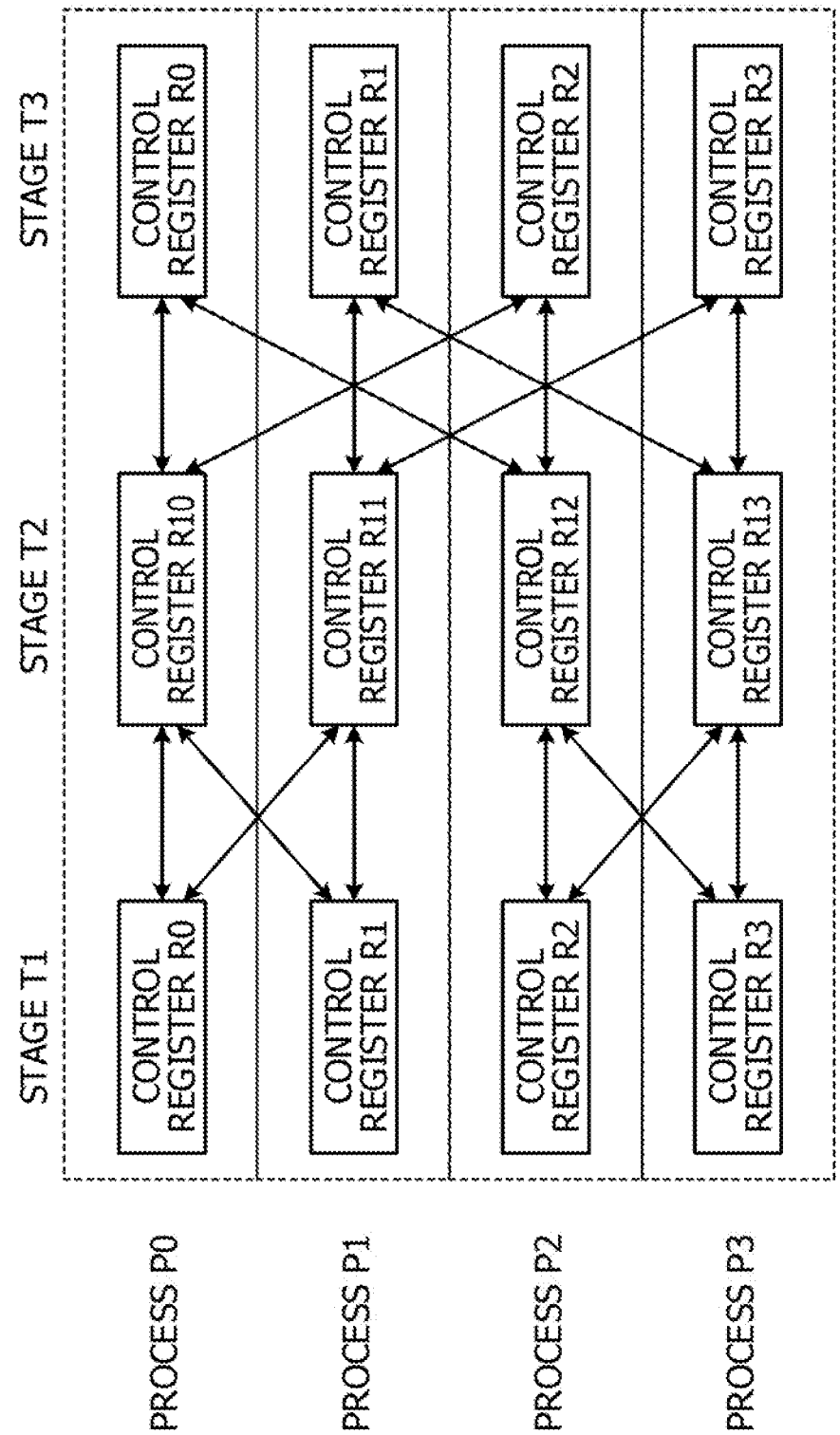
FIG. 6 is a diagram illustrating the transitions of the control registers used by the respective processes in individual stages.

FIG. 6 is a diagram illustrating the transitions of the control registers used by the respective processes in individual stages. A description is given of a case where processes P0 to P3 operate. Each of the processes P0 to P3 may operate at the same node 1, or may operate at different nodes.

The process P0 uses a control register R0 in a stage T1, a control register R10 in a stage T2, and the control register R0 in a stage T3. The process P1 uses a control register R1 in the stage T1, a control register R11 in the stage T2, and the control register R1 in the stage T3. The process P2 uses a control register R2 in the stage T1, a control register R12 in the stage T2, and the control register R2 in the stage T3. The process P3 uses a control register R3 in the stage T1, a control register R13 in the stage T2, and the control register R3 in the stage T3.

An advantage of making the control registers 120 used in each of the stages T1 to T3 different is that it is easy to confirm the progress of barrier synchronization processing in each of the processes P0 to P3, and it is easy to the control barrier synchronization processing.

In the stage T1 which is the start stage, the processes P0 to P3 use the destination information register 122 and do not have to use the signal register 121. In the stage T3 which is the final stage, the processes P0 to P3 use the signal register 121 and do not have to use the destination information register 122. Therefore, the processes P0 to P3 may use the same control register 120 in the stage T1 which is the start stage and the stage T3 which is the final stage. In this manner, even if the control registers 120 used in the stage T1 and the stage T3 are the same, it is possible to distinguish them from each other. This is because the barrier synchronization device 10 is able to determine that a stage is the stage T1 when no synchronization signal is input from other control registers 120 and that a stage is the stage T3 when no synchronization signal is output to other control registers 120. This makes it possible to reduce resources used in barrier synchronization processing. However, the control registers 120 used in the stage T1 and the stage T3 may be different from each other.

Figure 7:
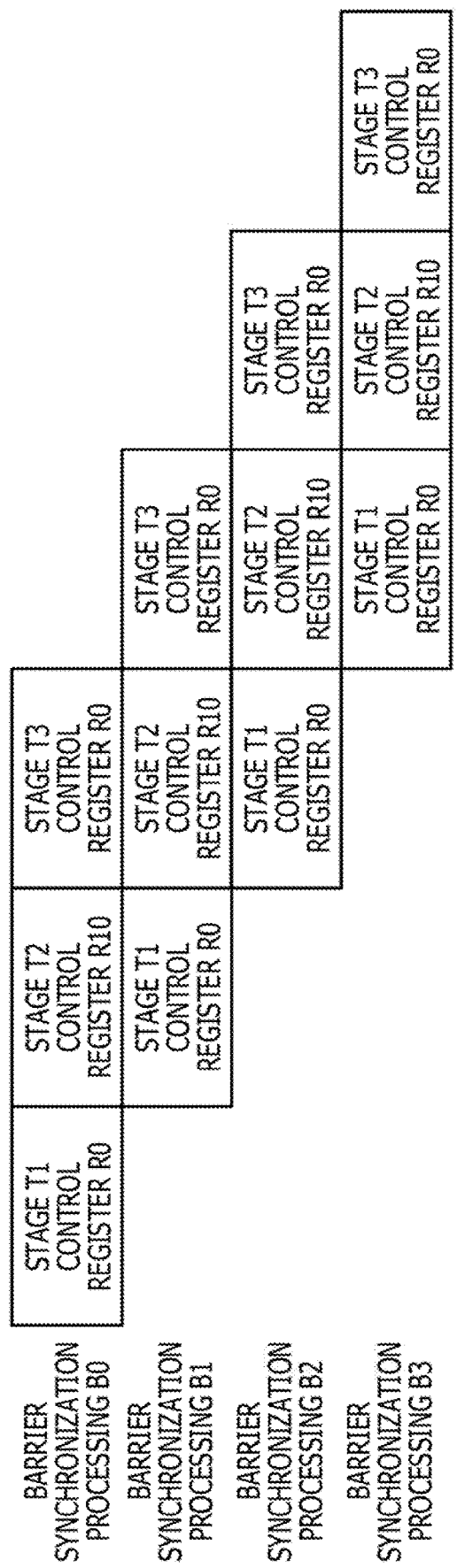
FIG. 7 is a diagram for describing the speedup of barrier synchronization processing.

Next, with reference to FIG. 7, the effect of speedup of barrier synchronization processing by the barrier synchronization device according to the present embodiment will be described. FIG. 7 is a diagram for describing the speedup of barrier synchronization processing.

Since synchronization processing is performed in a unit of the control register 120, one barrier synchronization device 10 may be instructed to execute a plurality of times of barrier synchronization processing. There may be cases where a plurality of times of barrier synchronization processing is repeatedly requested for the same process. A description given below as an example is of a case where barrier synchronization processing B0 to barrier synchronization processing B3 are repeatedly requested for one process. For example, the description is given of a case where each of the barrier synchronization processing B0 to the barrier synchronization processing B3 is divided stepwise into stages T1 to T3.

Barrier synchronization processing of related art does not allow an exit from a function in the middle of processing, so the stage T1 of the barrier synchronization processing B1 which is the next barrier synchronization processing is started after the completion of the stage T3 of the barrier synchronization processing 60 which is certain barrier synchronization processing. Therefore, in the barrier synchronization processing of related art, it takes a lot of time in total to complete all of the stages T1 to T3 of all the barrier synchronization processing B0 to the barrier synchronization processing B3.

In contrast, in the barrier synchronization device 10 according to the present embodiment, when a control register 120 for executing the stage T1 of the barrier synchronization processing B0 is released by transmitting a synchronization signal to a control register 120 of the following stage T2, the stage T1 of the following barrier synchronization processing B1 may be started. Therefore, the barrier synchronization device 10 according to the present embodiment may execute processing executed in each of the stages T1 to T3 in an overlapping manner by pipeline control.

It is assumed for example that the time taken for each of the stages T1 to T3 is the same. In this case, the barrier synchronization device 10 according to the present embodiment may complete the barrier synchronization processing B0 to the barrier synchronization processing B3 with the time obtained by adding the time taken for the stages T2 and T3 of the barrier synchronization processing 3 to the sum of the times taken for completion of the stage T1 of the barrier synchronization processing B0 to the barrier synchronization processing B3.

Generalizing the above description, when the number of stages is M (M≥1) and the number of times the barrier synchronization processing is repeated is N (N≥1), the processing time taken for the barrier synchronization processing of related art is N×M. In contrast, in the barrier synchronization device 10 according to the present embodiment, the processing time is N+M−1. For example, as compared with the barrier synchronization processing of related art, the barrier synchronization device 10 according to the present embodiment is able to realize speedup of barrier synchronization processing by time of (N−1)×(M−1). However, in practice, since there is a latency for transmission and reception of release notifications of a stage, a decrease in the processing time is slightly reduced.

Figure 8:
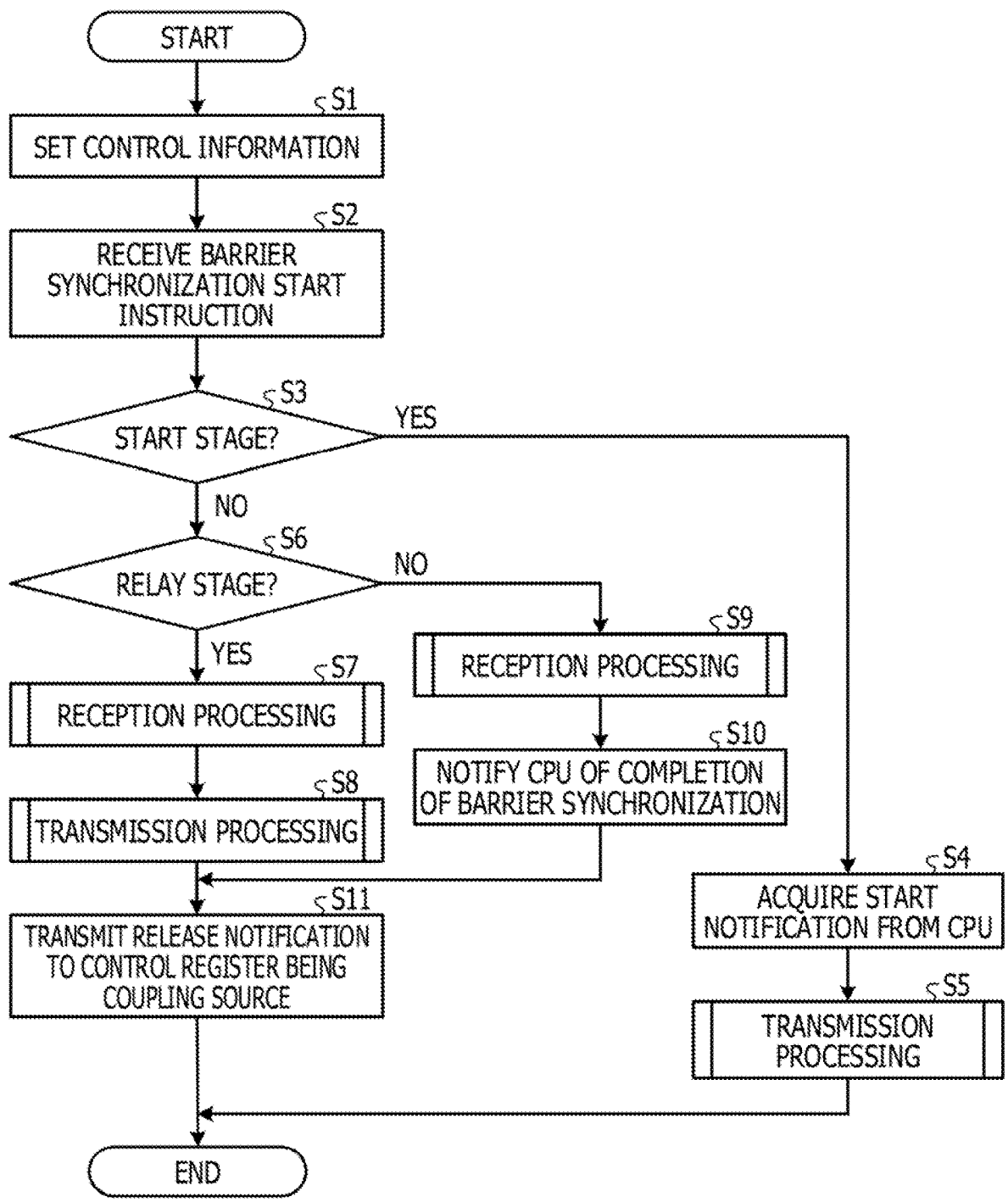
FIG. 8 is a flowchart of the overall barrier synchronization processing performed by the barrier synchronization device according to the embodiment.

Next, with reference to FIG. 8, an overall flow of barrier synchronization processing performed by the barrier synchronization device 10 according to the present embodiment will be described. FIG. 8 is a flowchart of the overall barrier synchronization processing performed by the barrier synchronization device according to the embodiment.

The information setting unit 112 receives input of setting conditions from the CPU 11. The information setting unit 112 sets control information in the destination information register 122 of a control register 120 in accordance with the acquired setting conditions (step S1). For example, the information setting unit 112 writes the destination address and the number given for the control register 120 to be the destination in the destination information register 122 of the control register 120 as the destination information 123. In addition, in accordance with the acquired setting conditions, the information setting unit 112 writes the coupling source address and the number given for a control register 120 to be the coupling source in the destination information register 122 of the control register 120 as the coupling source information 125. The synchronization control unit 113 acquires an algorithm and an execution condition of barrier synchronization processing from the setting conditions. The synchronization control unit 113 determines whether the own stage is the relay stage or the final stage from the algorithm of barrier synchronization processing. When the own stage is the relay stage or the final stage, the synchronization control unit 113 outputs an instruction to initialize the signal register 121 to the signal register management unit 111. The signal register management unit 111 receives the instruction from the synchronization control unit 113, and sets the value of each of the signals #0 to #n in the signal register 121 to 0 to initialize the signal register 121.

After that, the synchronization control unit 113 receives a barrier synchronization start instruction as a notification of reaching the barrier point from the CPU 11 (step S2). When receiving the barrier synchronization start signal, the synchronization control unit 113 starts barrier synchronization processing in accordance with the execution condition.

The synchronization control unit 113 determines whether or not a stage of synchronization processing that is executed by a control register 120 to be controlled instructed in the barrier synchronization processing is the start stage (step S3).

When the stage of the synchronization processing that is executed by the control register 120 to be controlled is the start stage (step S3: YES), the synchronization control unit 113 acquires a start notification for use in the barrier synchronization processing from the CPU 11 (step S4).

After that, the control unit 110 executes transmission processing (step S5). After completion of the transmission processing, the control unit 110 ends the synchronization processing of the control register 120 to be controlled.

On the other hand, when the stage of the synchronization processing that is executed by the control register 120 to be controlled is not the start stage (step S3: NO), the synchronization control unit 113 determines whether or not the stage of the synchronization processing is the relay stage (step S6).

When the stage of the synchronization processing that is executed by the control register 120 to be controlled is the relay stage (step S6: YES), the control unit 110 executes reception processing (step S7).

After that, the control unit 110 executes transmission processing (step S8).

On the other hand, when the stage of the synchronization processing that is executed by the control register 120 to be controlled is not the relay stage, but is the final stage (step S6: NO), the control unit 110 executes reception processing (step S9).

The synchronization control unit 113 notifies the CPU 11 of the completion of barrier synchronization (step S10).

After that, the control unit 110 transmits a release notification to the control register 120 being the coupling source (step S11).

Figure 9:
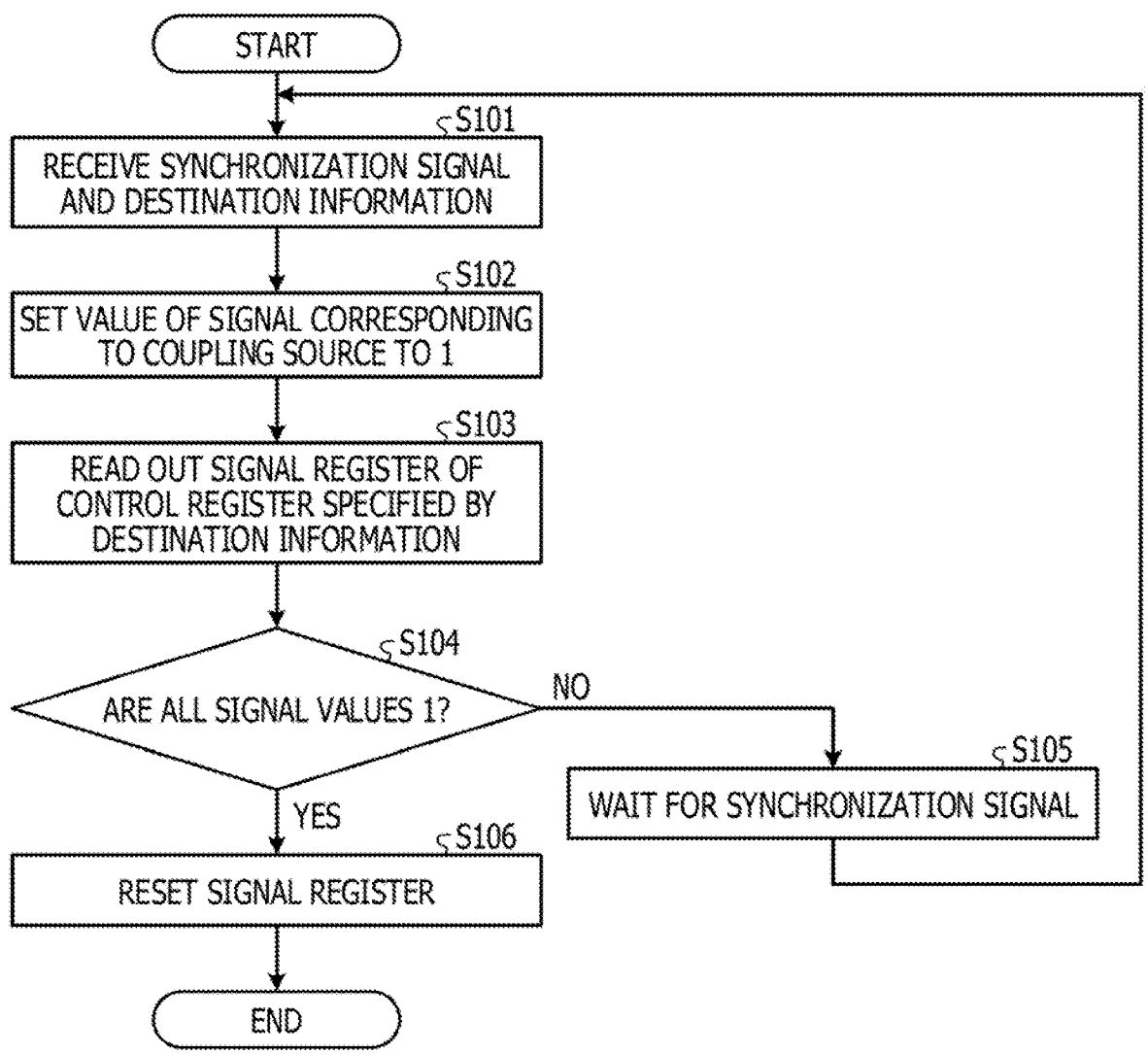
FIG. 9 is a flowchart of reception-side processing performed by the barrier synchronization device according to the embodiment.

Next, with reference to FIG. 9, a flow of the reception-side processing in the case where the barrier synchronization device 10 according to the present embodiment receives a synchronization signal from another barrier synchronization device 10 will be described. FIG. 9 is a flowchart of the reception-side processing performed by the barrier synchronization device according to the embodiment. The processing performed in the flowchart in FIG. 9 corresponds to an example of the processing performed in steps S7 and S9 in FIG. 8.

A flow of reception-side processing executed by the barrier synchronization device 10 for one control register 120 to be controlled is described. However, the barrier synchronization device 10 may execute reception-side processing in parallel for a plurality of control registers 120 to be controlled, in which case the processing of the flowchart in FIG. 9 is executed in parallel according to the number of control registers 120 to be controlled.

The synchronization control unit 113 receives, from the reception unit 101, a synchronization signal and destination information that are transmitted from a control register 120 being the coupling source (step S101). A description is given of a case where the destination information indicates the control register 120 to be controlled.

Next, the synchronization control unit 113 sets the value of any one of the signals #0 to #n corresponding to the control register 120 being the coupling source in the signal register 121 of the control register 120 specified by the destination information to 1 (step S102).

Next, the synchronization control unit 113 reads out the signal register 121 of the control register 120 specified by the destination information (step S103).

The synchronization control unit 113 determines whether or not all of the values of the signals #0 to #n are 1 (step S104). When 0 is present in the values of the signals #0 to #n (step S104: NO), the synchronization control unit 113 waits for a synchronization signal to be transmitted from the control register 120 to be controlled (step S105). After that, the synchronization control unit 113 returns to the step S101.

In contrast, when all of the values of the signals #0 to #n are 1 (step S104: YES), the synchronization control unit 113 instructs the signal register management unit 111 to reset the signal register 121. In response to the reset instruction, the signal register management unit 111 resets the signal register 121 (step S106). After that, the control unit 110 terminates the reception-side processing.

In FIG. 9, the description has been given of the case where resetting of the signal register 121 is performed in the step S106, but the resetting of the signal register 121 may be performed before the signal is transmitted to a control register 120 being the destination. For example, the resetting of the signal register 121 may be performed in transmitting a signal to a control register 120 being the destination. In the example of the processing illustrated in FIG. 9, the transmission processing is performed after the reception processing is completed.

Figure 10:
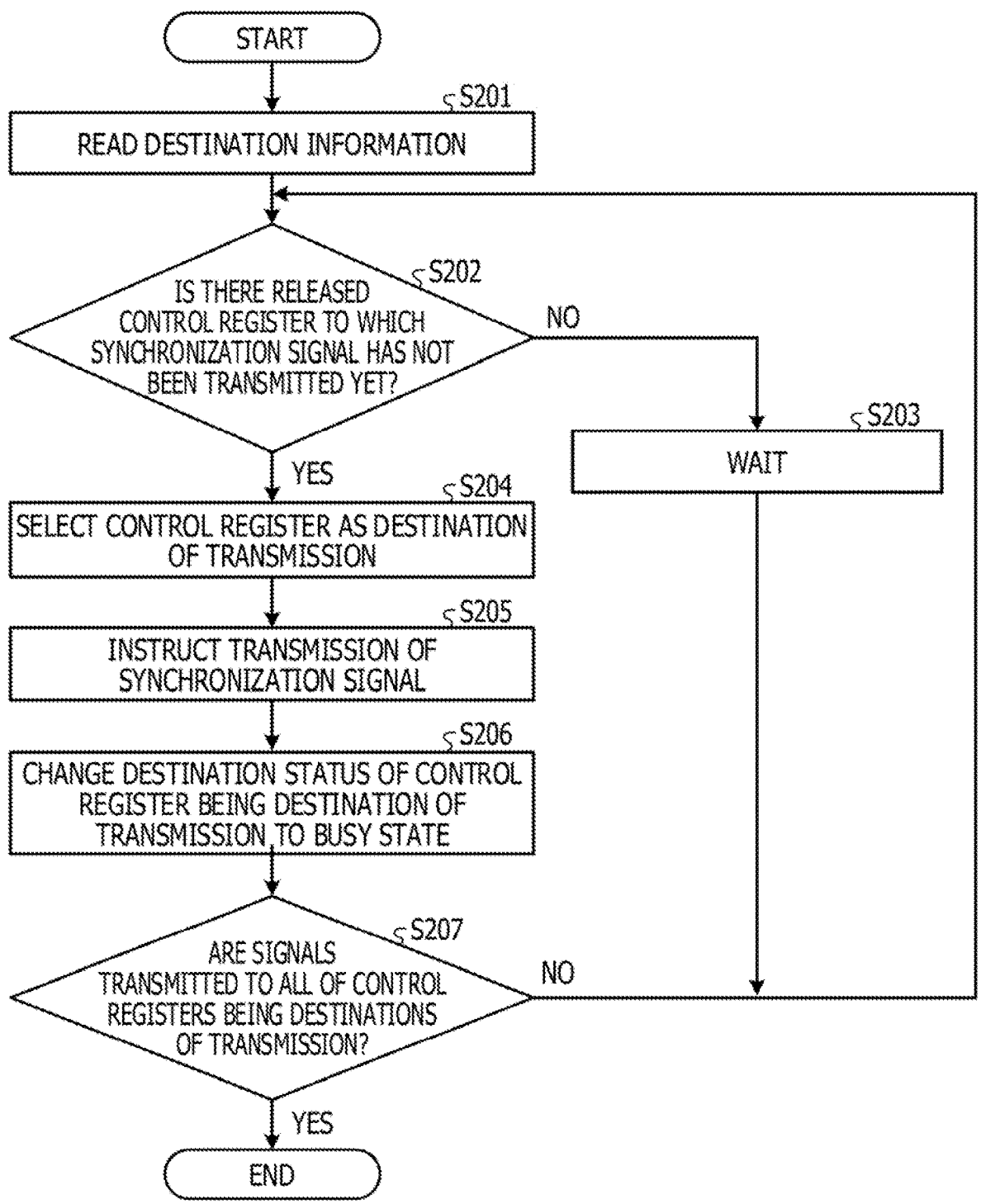
FIG. 10 is a flowchart of transmission-side processing performed by the barrier synchronization device according to the embodiment.

Next, with reference to FIG. 10, a flow of the transmission-side processing in the case where the barrier synchronization device 10 according to the present embodiment transmits a synchronization signal to another barrier synchronization device 10 will be described. FIG. 10 is a flowchart of the transmission-side processing performed by the barrier synchronization device according to the embodiment. The processing performed in the flowchart in FIG. 10 corresponds to an example of the processing performed in steps S5 and S8 in FIG. 8.

A flow of transmission-side processing executed by the barrier synchronization device 10 for one control register 120 to be controlled is described also in FIG. 10. However, the barrier synchronization device 10 may execute transmission-side processing in parallel for a plurality of control registers 120 to be controlled, in which case the processing of the flowchart in FIG. 10 is executed in parallel according to the number of control registers 120 to be controlled.

The synchronization control unit 113 reads the destination information 123 stored in the destination information register 122 of the control register 120 to be controlled (step S201).

Next, the synchronization control unit 113 refers to the destination status 124, and determines whether or not there is a released control register 120 among control registers 120 being destinations to which synchronization signals are not transmitted yet (step S202).

When there is no released control register 120 to which a synchronization signal is not transmitted yet (step S202: NO), the synchronization control unit 113 waits until any one of the control registers 120 being destinations to which synchronization signals are not transmitted yet is released (step S203). The synchronization control unit 113 returns to step S202.

On the other hand, when there is a released control register 120 to which a synchronization signal is not transmitted yet (step S202: YES), the synchronization control unit 113 selects the corresponding control register 120 as a control register 120 being the destination of transmission (step S204).

Next, the synchronization control unit 113 instructs the transmission control unit 115 to transmit a synchronization signal to the control register 120 being the destination of transmission (step S205). In response to this instruction, the transmission control unit 115 causes the transmission unit 102 to transmit a synchronization signal to the control register 120 being the destination of transmission.

After that, the synchronization control unit 113 notifies the status management unit 114 of the transmission of a synchronization signal to the control register 120 being the destination of transmission. The status management unit 114 sets the value of any one of the destination statuses ##0 to ##m in the destination status 124 corresponding to the control register 120 being the destination of transmission, which is instructed by the synchronization control unit 113, to 1, and changes the stage to a busy state (step S206).

After that, the synchronization control unit 113 determines whether or not synchronization signals are transmitted to all of the control registers 120 being destinations (step S207). When there is a control register 120 being a destination to which a synchronization signal is not transmitted yet (step S207: NO), the synchronization control unit 113 returns to the step S202.

When transmission of synchronization signals to all of the control registers 120 being destinations is completed (step S207: YES), the synchronization control unit 113 terminates the transmission-side processing.

Referring back to FIG. 8, the relationship between the reception-side processing and the transmission-side processing is described. Although FIG. 8 illustrates that the reception processing in step S7 is executed before the transmission processing in step S8 for convenience of description, the reception processing may be executed in parallel with the transmission processing. However, even in that case, the barrier synchronization device 10 transmits a synchronization signal to a control register 120 being a destination after the reception processing is completed.

In the present embodiment, description is given of a case where the barrier synchronization device 10 executes barrier synchronization processing using the algorithm of butterfly computation as an example, but the algorithm for barrier synchronization processing is not limited to this. For example, the barrier synchronization device 10 may employ other algorithms such as a dissemination algorithm and a pairwise exchange with recursive doubling algorithm. Barrier synchronization processing performed by the barrier synchronization device 10 according to the present embodiment may also be applied to collective communication executed while synchronization is performed such as reduction operation in addition to all-reduce processing.

As described above, in the execution of barrier synchronization processing which may be divided into a plurality of stages, when a control register transmits a synchronization signal to the following stage and barrier synchronization processing ends, the barrier synchronization device according to the present embodiment may cause the control register to execute the next barrier synchronization processing. For example, the barrier synchronization device according to the present embodiment may perform pipeline control of barrier synchronization processing and may execute the barrier synchronization processing in parallel by overlapping the individual stages. Thus, consecutive barrier synchronization processing may be speeded up.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   an arithmetic processing device including a first processor configured to execute arithmetic processing; and
   a synchronization device including a plurality of control registers, a control unit and a second processor coupled to the plurality of control registers, wherein the control unit is realized by the second processor that includes an information setting unit and status management unit, the second processor configured to perform a first barrier synchronization processing that includes a plurality of different first processing stages to be processed stepwise before performance of a subsequent barrier synchronization processing that includes a plurality of second processing stages, wherein:

the first processor is configured to send, to the information setting unit of the synchronization device, setting information to be used in a predetermined processing stage of the first barrier synchronization processing, and instruct the synchronization device to execute the predetermined processing stage for the arithmetic processing;

each of the plurality of control registers includes a setting information management area managed by the information setting unit to manage the setting information received from the first processor, the setting information identifying source registers and destination registers for synchronization signals used for the barrier synchronization processing, and a destination status area managed by the status management unit to store a usage state of each of the destination registers which are used in a next processing stage following the predetermined processing stage of the first barrier synchronization processing; and the second processor is configured to execute, for a first control register among the plurality of registers which is used for executing the predetermined processing stage, a first process by transferring data between the plurality of control registers, the first process including:

upon starting the predetermined processing stage of the first barrier synchronization processing, setting, by the status management unit, the usage state of each of the destination registers stored in the destination status area as an in-use state, upon receiving a first release notification indicating a release of a first destination register among the destination registers, setting, by the status management unit, the usage state of the first destination register stored in the destination status area of the first control register as a not-in-use state, when the usage state of a second destination register among the destination registers is in the not-in-use state based on the usage state stored in the destination status area for the second destination register, executing, based on the setting information stored in the first control register, the predetermined processing stage of the first barrier synchronization processing for the second destination register, and when the predetermined processing stage of the first barrier synchronization processing is executed for all the destination registers, sending, to the source registers identified by the setting information, which are used for executing a previous processing stage preceding the predetermined processing stage of the first barrier synchronization processing, a second release notification to cause the first barrier synchronization processing to proceed to the subsequent barrier synchronization processing that includes the plurality of second processing stages, wherein the first release notification releases the first control register for use in another stage of the plurality of different first processing stages to be processed stepwise, and the second release notification releases the source registers for use in the subsequent barrier synchronization processing.

2. The information processing apparatus of claim 1, wherein:

the plurality of processing stages to be processed stepwise are processed by the synchronization device and at least one other synchronization device.

3. The information processing apparatus of claim 2, wherein:

each of the plurality of control registers includes a signal area to store state information indicating a waiting state of synchronization signals; and the second processor is configured to:

upon receiving a synchronization signal from a first source register among the source registers, register, in the signal area of the first control register, the state information indicating that the synchronization signal has been received from the first source register, and determine whether to start the predetermined processing stage of the first barrier synchronization processing, based on the state information for all the source registers.

4. The information processing apparatus of claim 2, wherein, when the predetermined processing stage of the first barrier synchronization processing is completed, the second processor sends, to the first processor, a notification indicating completion of the predetermined processing stage of the first barrier synchronization processing, and the first processor confirms completion of the predetermined processing stage of the first barrier synchronization processing by receiving the notification.

5. The information processing apparatus of claim 1, wherein the plurality of processing stages include a start stage, at least one relay stage, and a final stage, wherein the start stage and the final stage is processed using a same register of the plurality of control registers.

6. The information processing apparatus of claim 1, wherein the plurality of processing stages are processed stepwise and overlapping manner by pipeline control.

7. The information processing apparatus of claim 1, wherein the plurality of processing stages include a start stage, at least one relay stage, and final stage;

when the predetermined processing stage of the first barrier synchronization processing is the at least one relay stage or final stage, the second processor is configured to initialize the first control register; and when the predetermined processing stage of the first barrier synchronization processing is the start stage the second processor is configured to not initialize the first control register.

8. The information processing apparatus of claim 7, wherein when the predetermined processing stage of the first barrier synchronization processing is the start stage, the second processor does not send the second release notification.

9. The information processing apparatus of claim 1, wherein the setting information includes at least one of coupling source and a destination for an output of the predetermined processing stage of the first barrier synchronization processing.

10. A synchronization device comprising:

a plurality of control registers, a control unit and a first processor coupled to the plurality of control registers, wherein the control unit is realized by the first processor that includes an information setting unit and status management unit, the first processor configured to perform a first barrier synchronization processing that includes a plurality of different first processing stages to be processed stepwise before performance of a subsequent barrier synchronization processing that includes a plurality of second processing stages, a second processor of an arithmetic processing device configured to execute arithmetic processing, wherein:

the second processor is configured to
- send, to the information setting unit of the synchronization device, setting information to be used in a predetermined processing stage of the first barrier synchronization processing, and instruct the synchronization device to execute the predetermined processing stage for the arithmetic processing;

each of the plurality of control registers includes
- a setting information management area managed by the information setting unit to manage the setting information received from the second processor, the setting information identifying source registers and destination registers for synchronization signals used for the barrier synchronization processing, and
- a destination status area managed by the status management unit to store a usage state of each of the destination registers which are used in a next processing stage following the predetermined processing stage of the first barrier synchronization processing; and the first processor is configured to execute, for a first control register among the plurality of control registers which is used for executing the predetermined processing stage of the first barrier synchronization processing, a first process by transferring data between the plurality of control registers, the first process including:
- upon starting the predetermined processing stage of the first barrier synchronization processing, setting, by the status management unit, the usage state of each of the destination registers stored in the destination status area as an in-use state,
- upon receiving a first release notification indicating a release of a first destination register among the destination registers, setting, by the status management unit, the usage state of the first destination register stored in the destination status area of the first control register as a not-in-use state,
- when the usage state of a second destination register among the destination registers is in the not-in-use state based on the usage state stored in the destination status area for the second destination register, executing, based on the setting information stored in the first control register, the predetermined processing stage of the first barrier synchronization processing for the second destination register, and
- when the predetermined processing stage of the first barrier synchronization processing is executed for all the destination registers, sending, to the source registers identified by the setting information, which are used for executing a previous processing stage preceding the predetermined processing stage of the first barrier synchronization processing, a second release notification to cause the first barrier synchronization processing to proceed to the subsequent barrier synchronization processing that includes the plurality of second processing stages, wherein the first release notification releases the first control register for use in another stage of the plurality of different first processing stages to be processed stepwise, and the second release notification releases the source registers for use in the subsequent barrier synchronization processing.

11. The synchronization device of claim 10, wherein the plurality of processing stages to be processed stepwise are processed by the synchronization device in connection with at least one other synchronization device.

12. The synchronization device of claim 10, wherein
the plurality of processing stages include a start stage, at least one relay stage, and a final stage, wherein
the start stage and the final stage is processed using a same register of the plurality of control registers.

13. The synchronization device of claim 10, wherein the plurality of processing stages are processed stepwise and overlapping manner by pipeline control.

14. The synchronization device of claim 10, wherein
the plurality of processing stages include a start stage, at least one relay stage, and final stage;
when the predetermined processing stage of the first barrier synchronization processing is the at least one relay stage or final stage, the first processor is configured to initialize the first control register; and
when the predetermined processing stage of the first barrier synchronization processing is the start stage the second processor is configured to not initialize the first control register.

15. The synchronization device of claim 14, wherein when the predetermined processing stage of the first barrier synchronization processing is the start stage, the first processor does not send the second release notification.

16. The synchronization device of claim 10, wherein the setting information includes at least one of coupling source and a destination for an output of the predetermined processing stage of the first barrier synchronization processing.

17. A method comprising:
executing arithmetic processing with an arithmetic processing device that includes a first processor;
sending, from the arithmetic processing unit to a synchronization device that includes a plurality of control registers, setting information used in a predetermined processing stage of synchronization processing of a first barrier synchronization processing that includes a plurality of different first processing stages to be processed stepwise before performance of a subsequent barrier synchronization processing that includes a plurality of second processing stages, wherein the synchronization device further including a control unit and a second processor coupled to the plurality of control registers, wherein the control unit is realized by the second processor that includes an information setting unit and status management unit;
storing, with the information setting unit of the synchronization device, the setting information received from the arithmetic processing device in a setting information management area included in each of the plurality of control registers, the setting information identifying source registers and destination registers for synchronization signals used for the barrier synchronization processing;
storing, with the status management unit of the synchronization device, in a destination status area included in each of the plurality of control registers, a usage state of each of the destination registers which are used in a next processing stage following the predetermined processing stage of the first barrier synchronization processing; and executing, by the second processor, for a first control register among the plurality of control registers which is used for executing the predetermined processing stage of the first barrier synchronization processing, a first process by transferring data between the plurality of control registers, the first process including:

upon starting the predetermined processing stage of the first barrier synchronization processing, setting, by the status management unit, a usage state of each of the destination registers stored in the destination status area as an in-use state, upon receiving a first release notification indicating a release of a first destination register among the destination registers, setting, by the status management unit, the usage state of the first destination register stored in the destination status area of the first control register as a not-in-use state, when the usage state of a second destination register among the destination registers is in the not-in-use state based on the usage state stored in the destination status area for the second destination register, executing, based on the setting information stored in the first register, the predetermined processing stage of the first barrier synchronization processing for the second destination register, and when the predetermined processing stage of the first barrier synchronization processing is executed for all the destination registers, sending, to the source registers identified by the setting information, which are used for executing a previous processing stage preceding the predetermined processing stage of the first barrier synchronization processing, a second release notification to cause the first barrier synchronization processing to proceed to the subsequent barrier synchronization processing that includes the plurality of second processing stages, wherein the first release notification releases the first control register for use in another stage of the plurality of different first processing stages to be processed stepwise, and the second release notification releases the source registers for use in the subsequent barrier synchronization processing.

18. The method of claim 17, wherein the plurality of processing stages to be processed stepwise are processed by the synchronization device in connection with at least one other synchronization device.

* * * * *